Dec. 9, 1941.  K. E. BURG  2,265,513
PROSPECTING METHOD AND APPARATUS
Filed June 10, 1939

KENNETH E BURG
INVENTOR.
BY Jesse R Stone
& Lester R Clark
ATTORNEYS.

Patented Dec. 9, 1941

2,265,513

UNITED STATES PATENT OFFICE 2,265,513

PROSPECTING METHOD AND APPARATUS

Kenneth E. Burg, New Orleans, La., assignor to Geophysical Service, Inc., Dallas, Tex., a corporation of Delaware Application June 10, 1939, Serial No. 278,576

3 Claims. (Cl. 181—0.5)

This invention relates to method and apparatus for locating subterranean earth formations by the seismic method of geophysical prospecting.

The seismic method of prospecting contemplates locating of underground formations by setting up elastic waves under the earth and determining the speed of propagation of such waves by detecting and recording the waves at points at a distance from the source thereof. In order to conserve explosives used for generating the elastic waves a record is made of the arrival of the waves at a relatively large number of points and it is usual to record the waves in a single common record in side by side relation so that the determination of time intervals is facilitated.

The waves are usually detected at desired spaced points by means of seismophones which are placed in contact with the earth so that the arriving waves will be converted from elastic waves into electrical waves which are conducted thru wire lines or conductor cables to a multiple recorder which records the waves on a moving strip. It is also customary to transmit to the recording mechanism and to record thereby an impulse indicating the instant of generation of the seismic waves.

The seismophones used as above indicated are usually placed with a suitable spread so that the array frequently spans hundreds of yards and in accordance with prior practice, cables or individual wires are connected between each seismophone and the recorder. Such cables or wires add weight to the equipment, are inconvenient to lay and to take up and are subject to deterioration or breaks which may prevent the making of part or all of the record that would otherwise be secured from the setting off of a single explosive charge.

The difficulties just indicated are also amplified in water covered areas where transportation is more difficult and greater trouble is experienced in laying and taking up the interconnecting cables of the system. The present invention is designed to obviate these difficulties and to enhance the obtaining of accurate results in the seismic method of prospecting, particularly in areas where the terrain is such as to render difficult movement from one point to another.

The principal object of the invention is to provide means and method of seismic prospecting whereby a single common record of the arrival of the seismic waves at spaced points may be effected without the necessity of laying interconnecting cables or wires.

Another object is to provide means and method for establishing and detecting elastic waves in the earth in relatively inaccessible areas and for receiving and recording in a common record the arrival of such waves at a plurality of widely spaced points.

A further object is to provide a system for locating subsurface anomalies in which interconnecting conductors between the points of wave generation, detection and recording are eliminated.

Still another object is to provide a prospecting system which is particularly adaptable for use in water covered areas.

The means and method comprising the invention whereby the enumerated objects and others may be realized, may be apparent from the following description taken in connection with the drawing in which.

Figure 1:
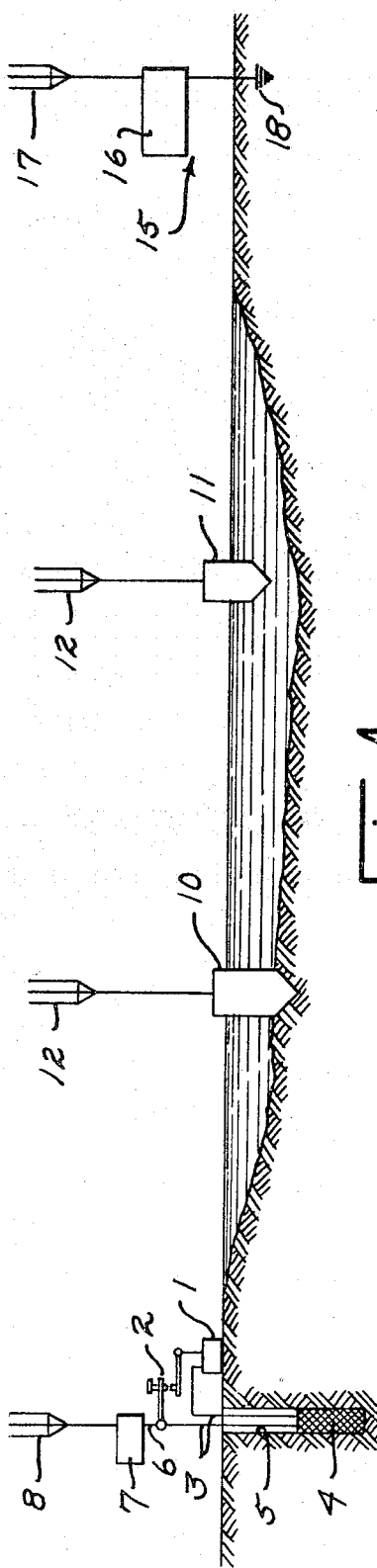
Fig. 1 is a diagrammatic view illustrating the prospecting system and the manner of using the same in a water covered area.

Referring to Fig. 1 the invention contemplates the creation of elastic waves in the earth by suitable means such as a blaster 1 connected thru a suitable key 2 and conductors 3 to an explosive charge 4 in the shot hole 5 in the earth. The blaster circuit is also connected by means of conductor 6 to a radio transmitter 7 provided with an antenna 8 so that an electro-magnetic impulse will be radiated from the shot point at the instant the circuit is closed and the charge 4 is detonated. It is to be understood that the shot point may be located beneath a body of water, altho the point as shown in the figure lies in open terrain.

Seismophones generally indicated as 10 and 11 are located at suitable points on the terrain overlying the structures of which information is sought. Such seismophones may be placed upon the surface of the soil or embedded therein whether or not the terrain under observation be covered with water. Alternately where the area is water covered the seismophone may be placed in the water as is indicated by the illustrated location of the seismophone 11 in Fig. 1.

While the seismophone units 10 and 11 are referred to as seismophones, attention is directed to the fact that this term is used in a generic sense. In accordance with the invention such units comprise a transducer for converting the elastic waves into electrical impulses which are conducted to a radio transmitter forming a part of the unit. Such transmitter has an output circuit which is connected to a portion of the unit to serve as a ground, the other terminal of the circuit being connected to an antenna 12, whereby the impulses are radiated from the point of detection.

Located at some convenient point is a recorder station generally indicated as 15. This station includes in addition to the usual recording equipment for producing a record of the shot instant and the arrival of the elastic waves at the respective points of detection, radio receiving equipment 16 provided with antennae 17 and a ground 18. Such receiving equipment is so constructed and arranged that the waves arriving at the respective points of detection are recorded in side by side relation upon a recording strip of paper or the like.

The preferred apparatus and method for accomplishing desired results comprehends the use of short wave transmitters at the shot point and at the respective seismophones 12. Each of these points of transmission is tuned to an individual wave length. Hence the equipment generally indicated as receiver 16 in Fig. 1 comprises in effect a plurality of receivers, each of which is tuned to the wave length of one of the transmitting stations In this manner it is believed apparent that the respective impulses which are transmitted from the several transmitting stations may readily be recorded in side by side relation by means of the equipment at the station 15.

Figure 2:
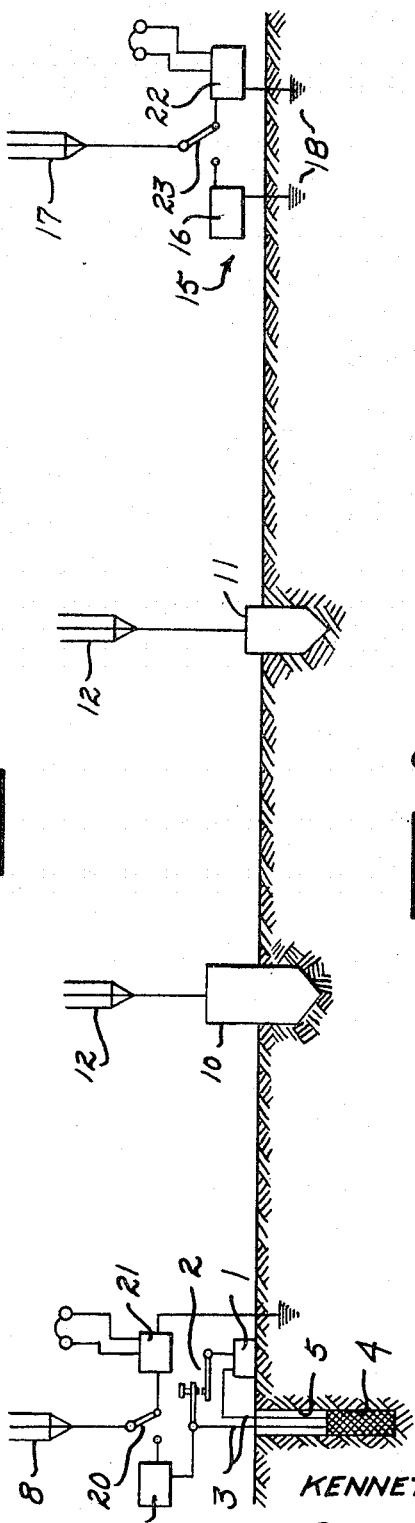
Fig. 2 is similar to Fig. 1 but illustrates the use of the invention on land areas and also shows more comprehensively the equipment which is used.

Fig. 2 is similar to that shown in Fig. 1 and similar parts are identified by like reference characters. It is to be noted, however, that the equipment at the shot point indicates a switch 20 whereby the antenna 8 may be connected as desired to the transmitter 7 or to a receiving unit 21. In a similar manner the receiving station 15 includes a recording unit 16 and a receiver 22 which may be selectively coupled to the antenna 17 by means of switch 23. By means of this arrangement intercommunication between the shot point and the point of recording may be readily established as the system is being prepared for the making of a record.

The system and technique constituting the invention are believed to be apparent from the foregoing description. By way of summary it may be pointed out that preliminary to making of an observation the shot point and the recording station 15 will be established. Also a suitable number of seismophones corresponding to those shown as 10 and 11 will be positioned as desired upon the terrain overlying the subsurface formations of which information is sought. If the respective elements constituting the system are in readiness the key 2 is closed, whereupon the seismic waves are generated in the earth thru the detonation of the explosive charge 4. At the same time a radio impulse will be transmitted from the antenna 8. Direct, reflected and refracted waves will travel thru the earth to the seismophones 10 and 11, whereupon such waves will be reproduced as electrical waves which are transmitted from the antennae 12. All of these transmitted impulses will be received thru the antennae 17 to produce a common record by means of the recorder 16.

So far as the present invention is concerned the specific construction of the elements constituting the apparatus is relatively unimportant, the only requisite being that such elements shall be capable of performing the desired functions. It is to be distinctly understood that while two seismophones are shown in the illustrated embodiment of the invention, any suitable number of seismophones may be used. Furthermore it is unnecessary that a single seismophone only be utilized at any of the points of detection since certain of the advantages may accrue by the use of a plurality of seismophones connected either in series or in multiple whereby a maximum of information is given from the trace which is produced by recording the impulses detected at a given point of detection.

Broadly the invention comprehends simplified apparatus and technique for prospecting whereby interconnecting conductors among the various units of the system are eliminated.

In accordance with the invention it is thus possible to place the units of the system at any desired convenient points regardless of the nature of the terrain over which observations are made.

What is claimed is:

1. Apparatus for determining subterranean earth formations comprising means for creating elastic waves in the earth, means for detecting said waves at spaced points remote from the first mentioned means, said detecting means including a radio transmitting device operable to transmit the detected waves, and receiving and recording means for producing a single common record of the waves transmitted from all of said points.

2. Apparatus for determining subterranean earth formations comprising means for creating elastic waves in the earth, means for transmitting an impulse at the instant of creating the elastic waves, means for detecting the elastic waves at spaced points remote from the source of said waves, a radio transmitter connected to the detector means at each of said points, and receiving and recording means for producing a record of all the transmitted impulses.

3. A system comprising a source of elastic waves including a radio transmitting station for transmitting an impulse at the instant of initiation of the elastic waves, a plurality of detector stations for the elastic waves, radio transmitting means at each of said stations for transmitting the series of impulses detected at said stations, and a receiving station, said receiving station including recording means for separately recording the impulses received from each of the sources of transmission.

KENNETH E. BURG.